United States Patent [19]

Takeshita

[11] 4,012,079
[45] Mar. 15, 1977

[54] BRAKE CONTROL APPARATUS ACTUATED BY SENSING THE DECELERATION OF A VEHICLE

[75] Inventor: Hiroshi Takeshita, Chiryu, Japan

[73] Assignee: Aisin Seiki Kabushiki Kaisha, Japan

[22] Filed: May 20, 1975

[21] Appl. No.: 579,244

[30] Foreign Application Priority Data

May 20, 1974 Japan .............................. 49-56361

[52] U.S. Cl. ................ 303/6 C; 188/349; 303/22 R; 303/24 A; 303/24 C; 303/24 F
[51] Int. Cl.² ...................... B60T 8/22; B60T 8/24; B60T 8/26
[58] Field of Search ............... 303/6 C, 6 R, 24, 22; 188/349, 195

[56] References Cited

UNITED STATES PATENTS

| | | | |
|---|---|---|---|
| 3,257,153 | 6/1966 | Strifler | 303/22 R |
| 3,297,368 | 1/1967 | Cumming | 303/22 R |
| 3,317,251 | 5/1967 | Hambling et al. | 303/22 R X |
| 3,475,059 | 10/1969 | Klein | 303/22 A |
| 3,825,303 | 7/1974 | Yabuta | 303/24 C X |

FOREIGN PATENTS OR APPLICATIONS

| 1,388,921 | 4/1964 | France | 303/22 R |
|---|---|---|---|

*Primary Examiner*—Trygve M. Blix
*Assistant Examiner*—Douglas C. Butler
*Attorney, Agent, or Firm*—Oblon, Fisher, Spivak, McClelland & Maier

[57] ABSTRACT

A brake control apparatus actuated by sensing the deceleration of a vehicle includes a shackle arm member swingably mounted upon a fixed portion of the vehicle at one end thereof and swingably mounted upon a movable portion of the vehicle at the other end thereof. The brake control apparatus fixedly mounted upon the shackle arm member includes a main body, an inlet port fluidically communicated with a master brake cylinder, an outlet port fluidically communicated with the wheel brake cylinders, and a valve member interposed between the inlet and outlet ports for controlling the fluid pressure from the master cylinder to the wheel brake cylinders by sensing a predetermined magnitude of deceleration generated in accordance with the load weight of the vehicle when the vehicle is braked thereby obtaining the most effective braking force within the system which will nevertheless not cause slippage or skidding of the vehicle regardless of the change in the load weight.

4 Claims, 3 Drawing Figures

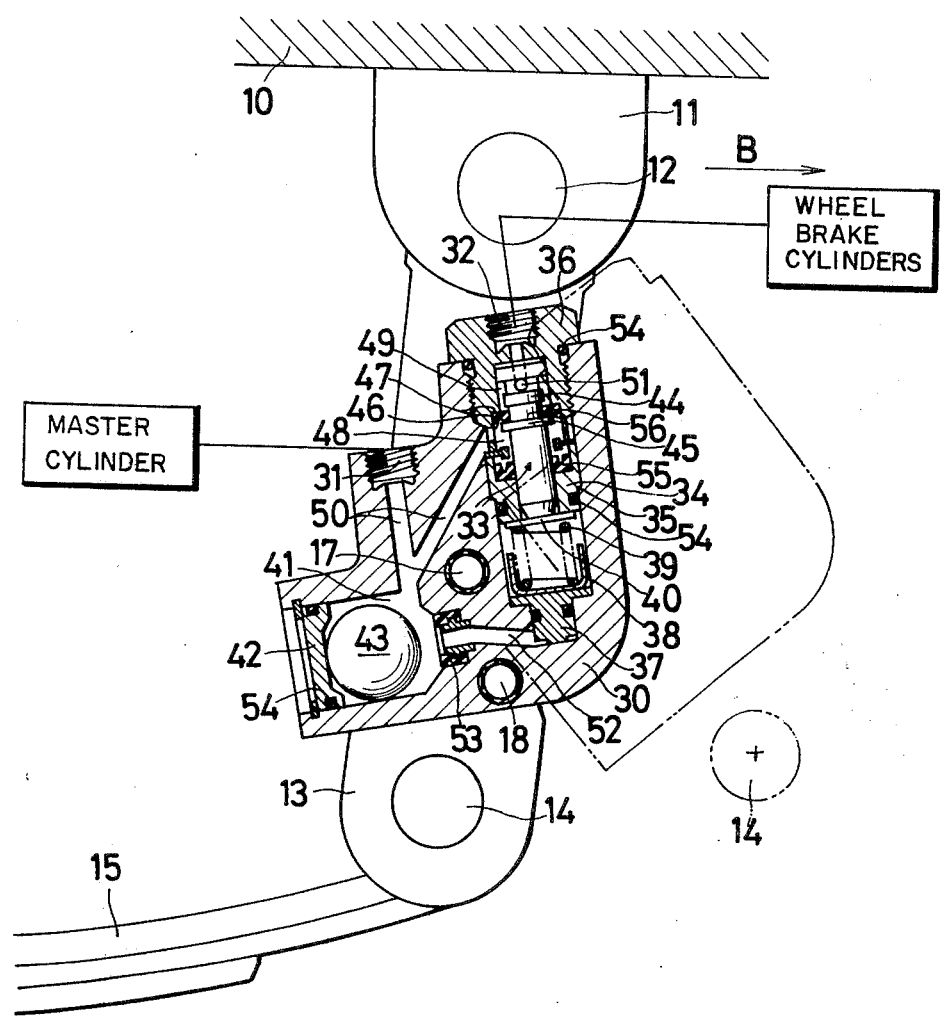

BRAKE CONTROL APPARATUS ACTUATED BY SENSING THE DECELERATION OF A VEHICLE

BACKGROUND OF THE INVENTION

1. Field of the Invention

The present invention relates generally to a brake control apparatus actuated by sensing the deceleration of a vehicle, and more particularly to a brake control apparatus actuated by sensing the deceleration of a vehicle for controlling the initiation of the braking actuation in response to the load weight of the vehicle.

2. Description of the Prior Art

Within the conventional brake control apparatus actuated by sensing the deceleration of a vehicle, a main body of a control valve swingably mounted upon the vehicle frame is mechanically connected to a wheel axle support means through means of a linkage mechanism whereby the entire structure of the device becomes complex, it is additionally inconvenient to interpose the linkage mechanism between the vehicle frame and the wheel axle support means which is essentially required to be simple, and still further, it is troublesome to select the point of attachment of the device.

SUMMARY OF THE INVENTION

Accordingly, it is an object of the present invention to provide a brake control apparatus actuated by sensing the deceleration of a vehicle which obviates the aforenoted conventional drawbacks.

Another object of the present invention is to provide an improved and highly simplified brake control apparatus actuated by sensing the deceleration of a vehicle.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein:

FIG. 3 is a view similar to that of FIG. 1, showing however, another embodiment of the present invention.

DETAILED DESCRIPTION OF THE PREFERRED EMBODIMENTS

Figure 1:
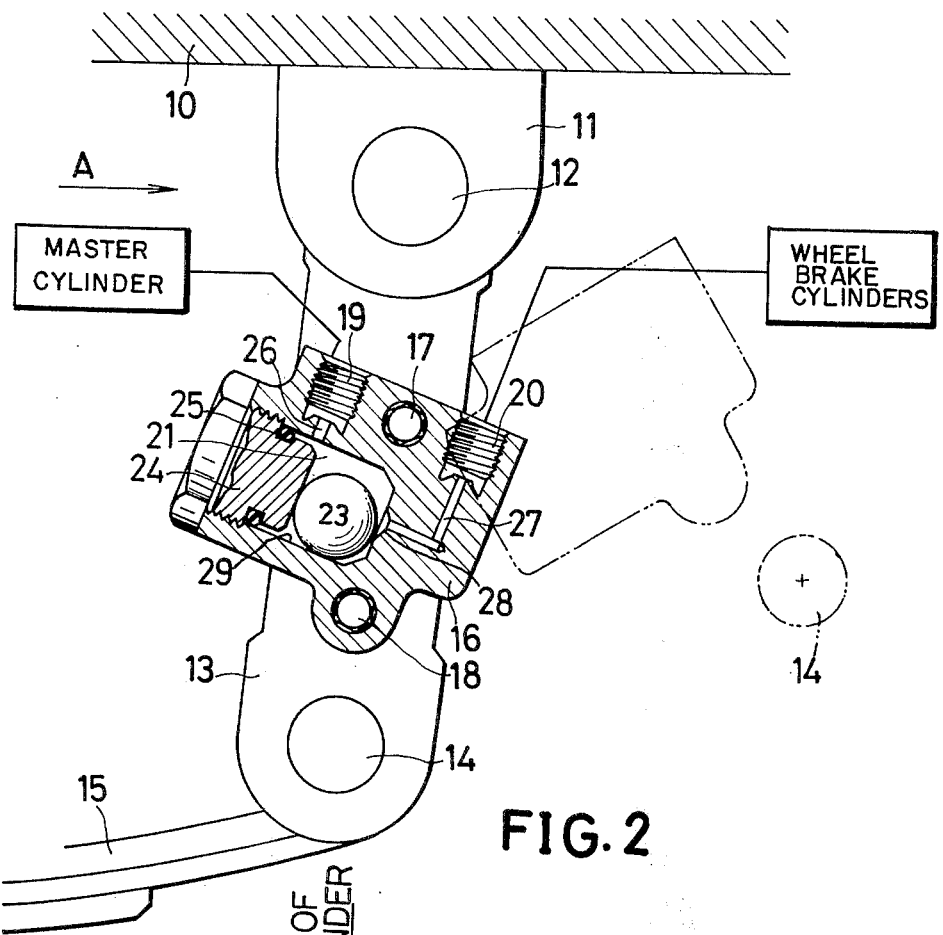
FIG. 1 is a partial sectional view of a brake control apparatus actuated by sensing the deceleration of vehicles, constructed in accordance with the present invention and showing its cooperative parts.

Referring now to the drawings, and more particularly to FIG. 1 thereof, there is shown a fixed member 10 of the vehicle, such as for example, a vehicle frame, and a bracket 11 is fixedly attached thereto. One end of a shackle arm 13 is swingably mounted upon the bracket 11 by means of a pin 12 while the other end thereof is swingably mounted, upon a movable member of the vehicle such as for example, a suspension means 15, by means of another pin 14, a main body 16 of a control valve being fixedly secured upon the shackle arm 13 by means of bolts 17 and 18.

The main body 16 is provided with a port 19 fluidically connected to a master cylinder, not shown, and a port 20 fluidically connected to a rear wheel brake cylinder or cylinders, also not shown. A tubular chamber 21 is formed within the main body 16 and a ball valve 23 is disposed within the tubular chamber 21 and sealingly maintained therewithin by means of a threaded socket 24 and an O-ring seal 25. The chamber 21 communicates with the ports 19 and 20 through means of passages 26 and 27, respectively, and a valve seat 28 is formed for seating the ball valve 23 at the opening portion of the passage 27 with respect to chamber 21. The fluidic communication between chamber 21 and port 20 is thus closed or opened by means of the actuation of the ball valve 23 relative to the valve seat 28.

An arrow A designates the direction in which the vehicle is moving and consequently, when the vehicle is braked, the ball valve 23 is seated upon the valve seat 28 upon being moved from a resting bearing surface 29 upon which the ball is normally mounted. Whether the ball valve 23 is in fact seated upon the valve seat 28, or not seated thereon is determined by means of the magnitude of the deceleration forces of the vehicle at the particular time, or in other words, such movement indirectly depends upon the braking force at that time, that is, the fluid pressure of the master cylinder, not shown.

In the instance that the ball valve 23 is seated upon the valve seat 28, the fluid pressure transmitted to the rear wheel brakes, not shown, through means of the port 20, is not correspondingly increased even if the fluid pressure supplied into the chamber 21 from the master cylinder, not shown, through means of the port 19 for braking the rear wheel brakes, not shown, is thereafter increased. The locking phenomenon of the rear wheel brakes, not shown, is thus prevented due to the fact that the greatest braking force applied to the brakes is controlled by the seating operation of the ball valve 23, upon the valve seat 28, which is moved in accordance with the deceleration of the vehicle caused by the braking forces just before the rear wheel brakes, not shown, achieve the locking phenomenon.

The most suitable braking force by which a high braking effect can be obtained without experiencing locking of the rear wheel brakes, not shown, is changeable in accordance with large or small changes in the weight load upon the rear wheel brakes, not shown, that is, the weight loaded upon the rear wheel brakes, not shown, upon loading something thereon, is greater than the non-loaded condition. In short, in the event that the load weight is large, the deceleration just prior to the generation of the locking phenomenon of the rear wheel brakes, is required to be large. Consequently, the fluid pressure of the master cylinder, upon seating the ball valve 23 upon the seat valve 28, becomes higher, upon loading of the vehicle, for preventing locking of the rear wheel brakes than under non-loaded conditions.

Figure 2:
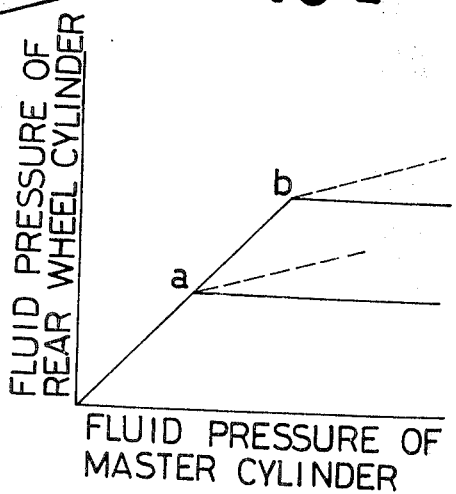
FIG. 2 is a graphic view showing the actuating characteristics of the present invention.

The foregoing is represented within FIG. 2, that is, the ball valve 23 is seated upon the valve seat 28 at the point $a$ under non-loaded conditions and thereafter the fluid pressure to the rear wheel brakes is not supplied, thereby preventing the rear wheel brakes from locking. However, in the case that the load weight upon the rear wheel brakes is increased upon loading something within the vehicle, the deceleration necessary just prior to locking of the rear wheel brakes is also increased, and when the fluid pressure of the master cylinder is at the point $b$, which has a higher value than that of point $a$, it is permissible to seat the ball valve 23 upon the valve seat 28 at the fluid pressure of the master cylinder at the point b.

The greatest fluid pressure for achieving braking, which may be permitted in accordance with a loading condition at the particular time, can be applied to the rear wheel brakes by altering the curved point of the characteristic curve line of the fluid pressure for braking extending from point a to point b in accordance with the load weight, and thus, a higher bracking force can be obtained without the generation of the locking phenomenon of the rear wheel brakes.

The operation of the embodiment of FIG. 1 will now be described hereinbelow in detail. The non-loaded condition of the vehicle is shown by means of the solid line in FIG. 1, and under load conditions, the suspension 15 is bent whereupon the shackle arm 13 is swung in the counterclockwise direction through a certain angular displacement. As a result, the main body of control valve 16 is swingably displaced to the dash and dotted line position, and consequently, the inclined angle of the rest bearing surface 29, upon which is disposed the ball valve 23, is changed. Accordingly, it can be understood that the deceleration forces must become large in order to seat the ball valve 23 upon the valve seat 28.

Since the shackle arm 13 is swung within a vertical plane extending parallel to the running direction of the vehicle, the direction of inertia of the ball valve 23 thus coincides with the direction in which the shackle arm 13 is swung. Consequently, it is possible to proportion the deceleration required in order to seat the ball valve 23 upon the valve seat 28 to the load weight by means of the simple construction whereby the main body of the control valve 16 is fixedly attached to the shackle arm 13. That is to say, it is possible to move the curved point of the characteristic curve of FIG. 2 in accordance with the load weight. Accordingly, the greatest braking force within the system which will nevertheless not cause slippage or skidding of the vehicle in accordance with changes in the load weight, is applied to the rear wheel brakes and as a whole to the vehicle, and therefore, a greater braking force is obtained while the locking condition of the rear wheel brakes is prevented.

Referring now to the embodiment of FIG. 3, a main body 30 of the control valve is fixedly secured upon the shackle arm 13 by means of bolts 17 and 18 and is capable of limiting the increase of fluid pressure of the wheel cylinders, not shown, at a lower increasing rate than the increase of fluid pressure of the master cylinder, also not shown.

The main body 30 is provided with a port 31 for receiving the fluid pressure from the master cylinder, and a port 32 for transmitting the fluid pressure into the wheel brake cylinders of the rear wheels, respectively, and a stepped piston 33 is slidably disposed within an inner tubular portion of main body 30. More particularly, a sleeve 34, provided with a cup seal 55, is inserted within the inner tubular portion of the main body 30 from the upper portion thereof until the sleeve 34 contacts an annular shoulder portion 35 formed within the main body 30 and subsequently the stepped piston 33 is slidably inserted therewithin and thereafter followed by means of threaded socket 36 which is threadedly engaged with the upper portion of body 30. A piston 37 should be inserted within the inner tubular portion of the main body 30 prior to the insertion of the sleeve 34 thereinto and subsequently, a cup-shaped spring retainer 38, a return spring 39, and a spring plate 40 are in turn disposed therein.

A tubular chamber 41, formed within the main body 30 and closed by means of a socket 42, has an O-ring seal 54 associated therewith, and is provided with a ball valve 43 therein. The stepped piston 33 has a valve portion 44 and a flange member 45 axially spaced therefrom, respectively, a valve seat 46 being interposed between the valve portion 44 and the flange 45. The valve seat 46 is in contact with a stepped portion 47 of the socket 36 and is maintained within the illustrated position by means of the actuating fluid pressure, a valve mechanism thus being attained by means of the valve portion 44 and the valve seat 46. Two chambers 48 and 49 are therefore defined within the main body 30 upon opposite sides of the valve mechanism comprising valve portion 44 and valve seat 46, the chamber 48 being in communication with the port 31 through means of a passage 50 while the chamber 49 is in communication with the port 32 through means of a passage 51. The lower end of the piston 37 is disposed within the right end of a fluid passageway 52 which is in fluidic communication with port 31 through means of passage 50 and chamber 41 and a valve seat 53 is formed within the opening of the passage 52 leading into chamber 41.

FIG. 3 shows the rest position of the main body of control valve 30 within which the braking operation is not conducted, and furthermore, the dotted and dash line shows the inclined state of the main body of the control valve 30 under load conditions of the vehicle, it being assumed that the vehicle in moving in the direction of arrow B.

In the instance that the fluid braking pressure from the master cylinder is supplied to the port 31, the fluid pressure is in turn supplied to the chamber 48 through means of the passage 50, and the fluid pressure transmitted into the chamber 48 is likewise supplied to the chamber 49 after passing between the flange 45 and the valve seat 46 and also passing through the valve portion 44 during the opening thereof whereupon the fluid pressure transmitted into chamber 49 is able to be supplied from port 32 to the wheel brake cylinders of the rear wheels through means of passage 51. Accordingly, the braking actuation of the rear wheels is attained, and the braking force, below a predetermined value, is applied to the rear wheels under these conditions.

More particularly, under such conditions, the upper end of the stepped piston 33 is in contact with the inner surface of the socket 36 as is viewed and this state of piston 33 is maintained by means of the return spring 39. The same fluid pressure as the fluid pressure supplied to the wheel brake cylinders of the rear wheels is simultaneously applied to the piston 37 through means of the chamber 41, and passages 50 and 52, such pressure resulting in the return spring 39 being compressed between piston 37 and plate 40, and consequently, the stepped piston 33 is urged upwardly as a result of such compression of return spring 39 and the movement of plate 40 whereby the upper end of stepped piston 33 contacts the inner surface of socket 36. While the fluid pressure within chamber 48 acts upon the stepped piston 33 with a pressure proportional to the interior diametrical area of the cup seal 55, that is, upon the sectional area of the longitudinal portion of the stepped piston 33, the stepped piston 33 is thereby lowered or moved downwardly resulting in a movement opposing the upward force transmitted by the return spring 39.

However, as the sectional areas of the stepped piston 33 and the piston 37 are constructed so as to be equal to each other, the fluid pressure tending to lower the stepped piston 33, and the fluid pressure tending to bias the stepped piston 33 upwardly through means of return spring 39, compensate and cancel each other, and consequently, the stepped piston 33 is held in contact with the inner surface of the socket 36 and the return spring 39 is maintained in its compressed state under such a predetermined pressure value. This means that the braking force, below a predetermined value or in other words the braking actuation, is actuated below a predetermined deceleration. Within this state, the same braking fluid pressure is supplied to both the front and rear wheels, not shown, and with reference to FIG. 2, the braking actuation is actuated by means of the fluid pressure of the master cylinder not shown, having a value less than at point $a$.

In the instance that the braking force is further increased and the deceleration exceeds a predetermined value, the ball valve 43 will be seated upon the valve seat 53 as a result of the inertia thereof and thereafter the piston 37 will not be biased by means of fluid pressure within conduit 52. However, the increased fluid pressure from the master cylinder is nevertheless continuously supplied to the chamber 48 through means of the passage 50, and consequently, in the event that the master cylinder pressure is continuously increased after the ball valve 43 has been seated upon the valve seat 53, the fluid pressure within the chamber 48 tending to lower the stepped piston 33 becomes larger than the force of the return spring 39 opposing the same, and therefore, the stepped piston 33 is lowered and the valve portion 44 thereof is seated upon valve seat 46.

While the pressure tending to move the stepped piston 33 downwardly is the fluid pressure within chamber 49 which acts upon the diametrical seal area of the valve seat 36, the fluid pressure within chamber 48 acts upon the annular sectional area thereof minus the sectional area of the small diameter portion 56 of the stepped piston 33, and the force of spring 39 acts upon stepped piston 33. Since the diametrical seal area of the valve seat 46 is larger than the abovementioned annular sectional area, the increasing ratio of the fluid pressure within chamber 49 compared with the increasing ratio of the fluid pressure of the master cylinder, that is, the increasing ratio of the fluid pressure of the rear wheel cylinders, is smaller than that of the master cylinder.

However, when the fluid pressure of the master cylinder is continuously increased, the upwardly acting fluid pressure acting upon the abovementioned annular sectional area is increased so that the downwardly acting pressure, acting upon the abovementioned diametrical seal area of the valve seat 46, is overcome and consequently, the stepped piston 33 is moved slightly upwardly whereupon the valve portion 44 is opened. Immediately subsequent to the opening of the valve portion 44, the chambers 48 and 49 are in fluidic communication with each other and a small amount of fluid pressure within chamber 48 is transmitted into chamber 49, and consequently, fluid pressure within chamber 48 which communicates with the master cylinder, and the pressure within chamber 49 which communicates with the wheel cylinders, become equal again whereby the upper end of the stepped piston 33 is again in contact with the inner surface of the socket 36. It is thus apparent that as long as the fluid pressure of the master cylinder is increased, the aforenoted cycle is continuously repeated while the braking actuation is being obtained.

In the instance that the inertia of the ball valve 43 is lost during the abovementioned operation and the ball valve 43 falls to the position shown, whereby the valve is again opened, the abovementioned actuation of the stepped piston 33 is terminated and the fluid pressure of the master cylinder is directly transmitted to the rear wheel cylinders.

It has been assumed that the ball valve 43 is seated upon the valve seat 53 when the fluid pressure of the master cylinder is at the point $a$, and it is thus seen that subsequent thereto, the fluid braking pressure applied to the wheel cylinders is increased at a lower rate than that of the master cylinder according to the characteristic curved line shown by the dotted line of FIG. 2.

When a load acts upon the rear wheels, such as for example, as a result of a load weight impressed upon the vehicle, the main body of the control valve 30 is inclined along with the shackle arm 13 to the dotted and dash line shown in FIG. 3 as in the case of FIG. 1. The seating time of the ball valve 43 is thus altered and delayed by means of the same operation as in FIG. 1 and the fluid pressure of the master cylinder reaches the point $b$. Thereafter, the fuid pressure of the wheel cylinders is increased according to the characteristic curved line shown by the dotted and dash line from point $a$ in FIG. 2, the two dotted lines from points $a$ and $b$ in FIG. 2 denoting the same inclined angle.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. In a vehicle having a frame member and a movable spring suspension member, wheel brake cylinders and a master cylinder, and a fluid passage connecting said wheel brake cylinders to said master cylinder, the improvement, which includes a brake control apparatus actuated by sensing the deceleration of said vehicle consisting of:
    a single arm member swingably secured directly upon said frame member at one end thereof and swingably secured directly upon said movable spring suspension member at the other end thereof for directly interconnecting said frame and spring suspension members;
    said brake control apparatus being fixedly secured upon said arm member including a main body, an inlet port fluidically communicated with said master cylinder, an outlet port fluidically communicated with said wheel brake cylinders, and a valve member interposed between said inlet and outlet ports for controlling the fluid pressure flow from said master cylinder to said wheel brake cylinders by sensing a predetermined deceleration of said vehicle, which is also dependent upon the load weight of said vehicle, when said vehicle is braked.

2. A brake control apparatus actuated by sensing the deceleration of a vehicle, as set forth in claim 1, wherein:

said valve member is provided with a ball valve and a valve seat for seating said ball valve thereon by sensing a predetermined deceleration of said vehicle.

3. A brake control apparatus actuated by sensing the deceleration of a vehicle, as set forth in claim 1, said brake control apparatus further comprising:
- a stepped piston slidably disposed within said main body for regulating the communication between said inlet and outlet ports;
- a piston slidably disposed within said main body for acting upon said stepped piston in accordance with the actuation of said valve member; and
- a spring interposed between said stepped piston and said piston for biasing said stepped piston in order to communicate said inlet port with said outlet port.

4. A brake control apparatus actuated by sensing the deceleration of a vehicle, as set forth in claim 3, said brake control apparatus further comprising:
- a valve portion formed upon said stepped piston; and
- a seat member formed within said main body for cooperating with said valve portion of said stepped piston, thereby controlling the communication between said inlet and outlet ports.

* * * * *